May 27, 1952 R. R. AMBLER 2,598,655
APPARATUS FOR VULCANIZING ENDLESS BELTS
Filed May 28, 1948 2 SHEETS—SHEET 1
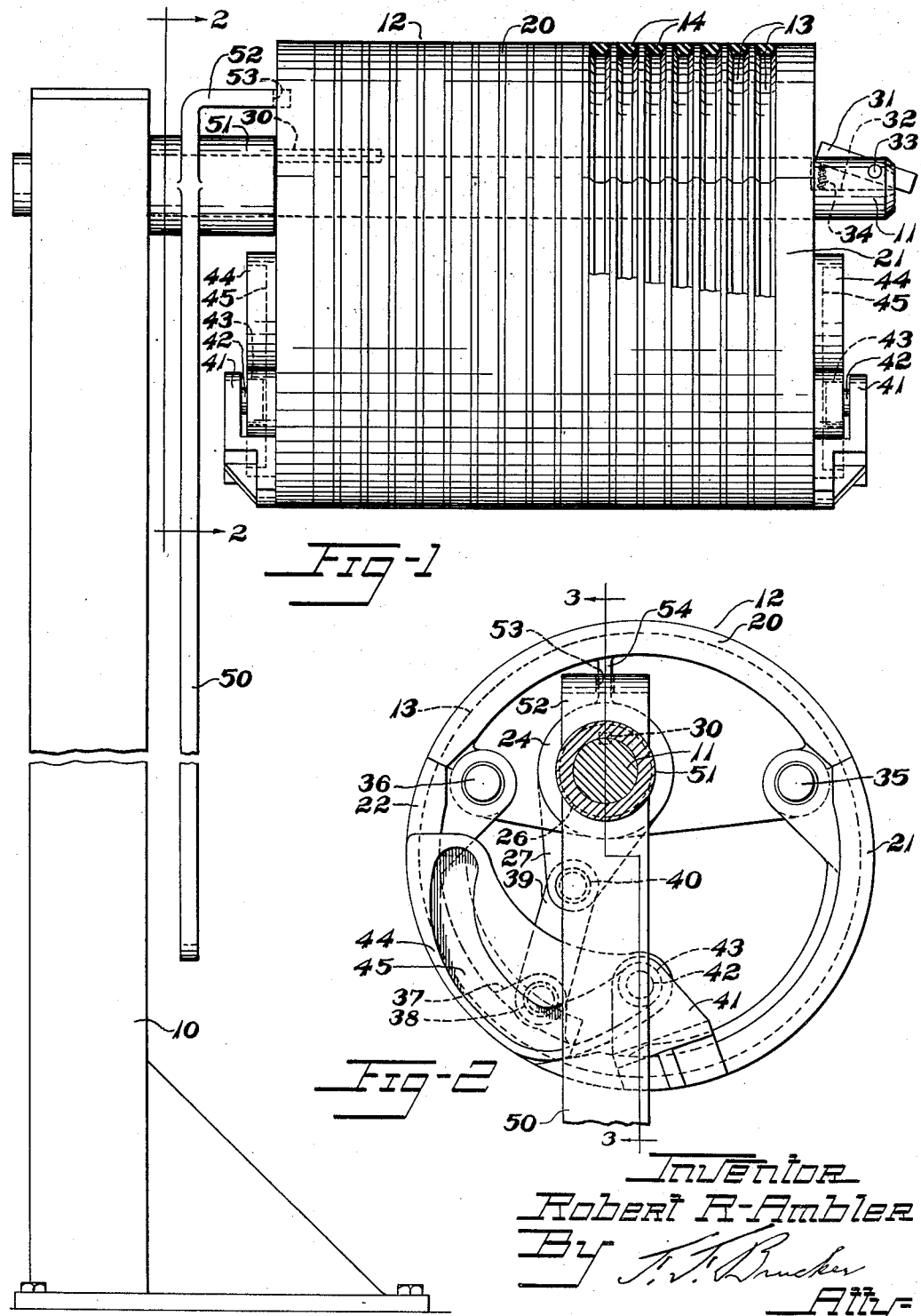
Inventor
Robert R. Ambler
By
Atty.

May 27, 1952    R. R. AMBLER    2,598,655
APPARATUS FOR VULCANIZING ENDLESS BELTS
Filed May 28, 1948    2 SHEETS—SHEET 2
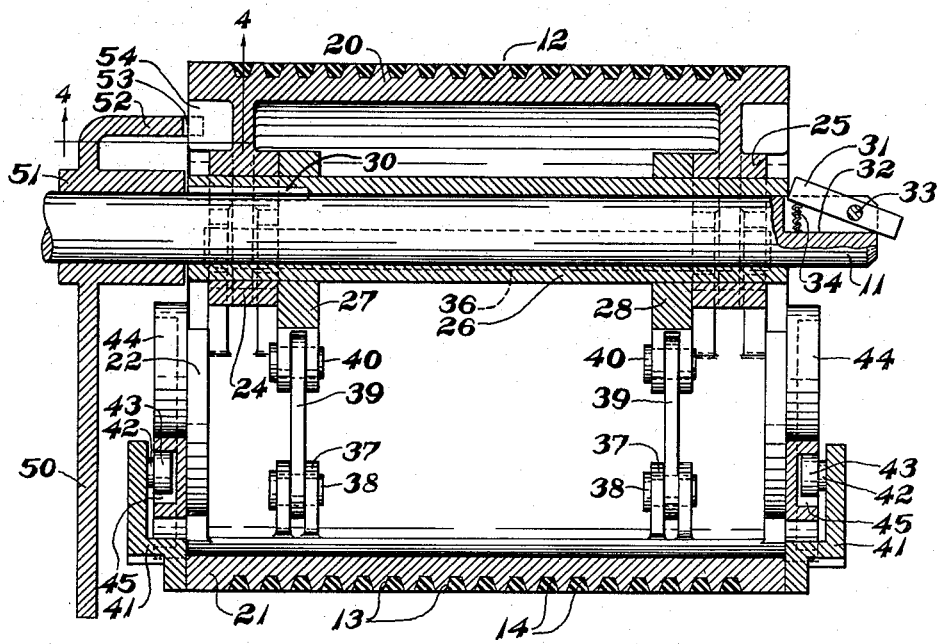
Fig-3
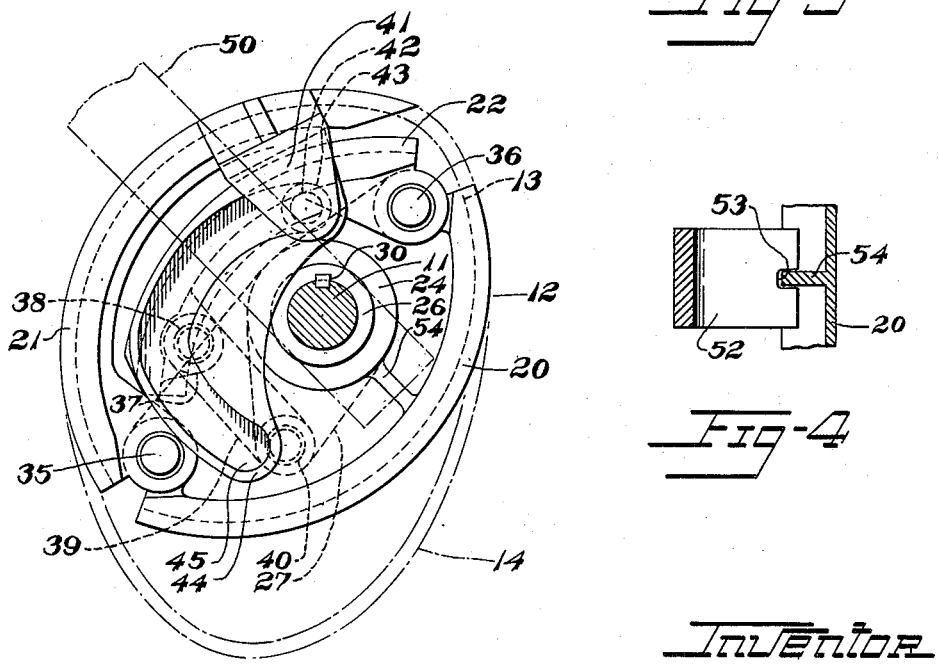
Fig-5
Fig-4
Inventor
Robert R. Ambler
By
Atty.

Patented May 27, 1952

2,598,655

UNITED STATES PATENT OFFICE 2,598,655

APPARATUS FOR VULCANIZING ENDLESS BELTS

Robert R. Ambler, Akron, Ohio, assignor to The B. F. Goodrich Company, New York, N. Y., a corporation of New York Application May 28, 1948, Serial No. 29,998

4 Claims. (Cl. 18—45)

This invention relates to apparatus for vulcanizing endless belts and is especially useful in vulcanizing V-belts or other belts of small cross-sectional dimensions.

In the manufacture of small belts of trapezoidal cross-section, the belts have been assembled of rubber or other rubber-like material and textile material in the form of cords or fabric or both, the cords being of cotton or other natural or synthetic material or of metallic wire. After the belts have been assembled they usually have been placed in confining molds and vulcanized to shape them and to set the rubber-like material.

Great difficulty has been encountered in maintaining the cords and fabric under proper tension while placing them in the molds and during vulcanization of the belts while they are in the molds resulting in belts in which the cords and fabric are so misplaced as not to perform their intended functions efficiently and belts having excessive stretchability. Where it is desired to employ the belts in multiple belt drives, uniformity of stretchability of the belts is of great importance in providing for equal division of the load upon the belts.

It is an object of the present invention to provide for effectively tensioning the belts within the confining grooves of molding apparatus while mounting the belts upon such apparatus, and to so tension belts as a group.

Another object of the invention is to provide effectively for shaping the belts during vulcanization thereof while providing for quickly mounting and dismounting the belts between molding surfaces.

Other objects are to support the molding apparatus for mounting and dismounting the belts, to provide molding mechanism collapsible into small space, and to provide for simultaneously vulcanizing a plurality of belts at one time.

A further object is to provide positive operation of the collapsing mechanism.

These and other objects will appear from the following description and the accompanying drawings.

Of the drawings:

Fig. 1 is a front elevation of a molding drum and stand, portions being broken away.

Fig. 2 is a cross sectional view thereof taken on line 2—2 of Fig. 1 showing the drum in expanded position.

Fig. 3 is a sectional view, taken on line 3—3 of Fig. 2.

Fig. 4 is a detail sectional view taken on line 4—4 of Fig. 3.

Fig. 5 is a view similar to Fig. 2, showing the drum in collapsed position.

Referring to the drawings, the numeral 10 designates a stand having a horizontal shaft 11 secured thereto for removably supporting a collapsible drum 12. The drum 12 is of cylindrical shape and has a multiplicity of spaced-apart circumferential grooves 13 for forming belts therein. For the purpose of mounting and demounting the belts 14 in the grooves, the drum is formed of three complementary sections 20, 21, 22 of which the section 20 has aligned hubs 24, 25 which are eccentrically positioned relative to the cylindrical face of the drum to provide greater collapsing movement of the sections. A sleeve 26 rotatably extends through the hubs and has a pair of crank arms 27, 28 fixed thereto which abut against the inner faces of the hubs and act as collars to retain the sleeve therein.

The shaft 11 has a feather key 30 for slideably engaging a keyway in the sleeve to prevent relative rotation of the sleeve and shaft. A latch 31 is located in a slot 32 at the projecting end of the shaft 11 and is pivotally secured therein by a pin 33 extending into the shaft. A coil spring 34 holds the latch in projecting relation to the shaft to retain the sleeve 26 thereon but the latch may be depressed to permit removal.

The section 22 is hingedly secured to the section 20 by a hinge pin 36 having an axis parallel to shaft 11. Ears 37 are formed on section 22 and are pivotally connected by pins 38 to links 39 which are in turn pivotally connected to crank arms 27, 28 by pins 40. The arrangement is such that section 22 is swung about pivot pins 36 by relative rotational movement of sleeve 26 and section 20.

Section 21 is hingedly connected to section 20 by a pivot pin 35, parallel to shaft 11 and at one end of the section. At the other end of section 21 a pair of ears 41 are provided having pins 42 on which cam rollers 43 are freely rotatable. Section 22 has a pair of cam plates 44 thereon having cam grooves 45 for guiding the rollers. The cam grooves are of such shape that as section 22 is moved toward the shaft 11, section 21 is also moved toward the shaft to a position overlapping section 22 as seen in Fig. 5.

For manipulating the sections of the drum to mount the belts in the grooves and properly tension them therein, a lever 50 has a hub 51 journaled on shaft 11. Its short arm is bent to provide a dog 52 having a terminal slot 53 (see Fig. 4) adapted to straddle a web 54 of section 20 to rotate section 20 with it about shaft 11. As the sleeve 26 to which crank arms 27 and 28 are secured cannot rotate with the section 20, the sections 21, 22 are swung inwardly by such movement to collapse the drum.

In the collapsed position of the drum as shown in Fig. 5, the belts 14 may be removed without stretching them as they are of greater circumference than that of the collapsed drum.

In the operation of the apparatus, the lever 50 is rotated about the fixed shaft 11 to collapse the drum as shown in Fig. 5. Belts 14 are placed over the drum, one being placed in each groove. The drum is then expanded by moving the lever 50 in the opposite direction to seat the belts and tension them in the grooves. In the expanded position, as shown in Fig. 2, the crank arms 27, 28 are on dead centers and hold the drum in the expanded form. The latch 11 is then depressed and the drum withdrawn axially of the shaft 11. The drum with the belts thereon is then placed in an open steam vulcanizer to cure the belts. After the belts have been vulcanized the drum is replaced on shaft 11 and collapsed. Thereupon the belts may be removed and replaced by others.

Variations may be made without departing from the scope of the invention as it is defined by the following claims.

I claim:

1. Apparatus for vulcanizing endless belts, said apparatus comprising a drum having a plurality of segmental sections mounted for collapsing movement of a section relative to another with said sections collectively providing a plurality of parallel circumferential belt-molding grooves, one of said sections having a hub with a bore extending axially of said drum, a pair of hinged sections pivotally supported one at each end of the first said section for collapsing movement, means on one of said hinged sections engaging cam means on the other of said hinged sections for effecting simultaneous movement of said sections, and means rotatably mounted in said hub and connected to one of said hinged sections for moving said hinged sections by relative movement of said means and said hub to seat the belts in said grooves in a taut condition and to free the belts from said grooves.

2. Apparatus for vulcanizing endless belts, said apparatus comprising a drum having a plurality of segmental sections mounted for collapsing movement of a section relative to another with said sections collectively providing a plurality of parallel circumferential belt-molding grooves, one of said sections having a hub with a bore extending axially of said drum, a pair of hinged sections supported one at each end of the first said section for collapsing movement toward each other into overlapping relation, said hub being eccentric to the periphery of said drum and thereby providing space for such collapsing movement, a quill rotatably mounted in the bore of said hub, means on said quill and engaging one of said hinged sections for effecting expanding and collapsing movements thereof, means on said one hinged section and engaging the other hinged section for effecting simultaneous movement of said hinged sections, a support nonrotatably engaging the bore of said quill, and means mounted on said support and rotatable thereabout for engaging the hubbed section of said drum for providing relative rotational movement of said hubbed section and said quill to expand and contract said drum to seat the belts in said grooves in a taut condition and to free the belts from said grooves.

3. Apparatus for mounting endless belts for vulcanizing them, said apparatus comprising a support, a shaft nonrotatably mounted thereon, a collapsible belt-molding drum removably mounted on said shaft, said drum comprising a sleeve arranged for nonrotative engagement with said shaft and having circumferential grooves for receiving the belts, a drum section having a fixed hub with a bore rotatively mounted on said sleeve, complemental drum sections moveable relative to the first said section and hingedly secured thereto, means connected between one of said complementary drum sections and said sleeve and means on one of said movable drum sections engaging cooperating means on the other movable drum section effective upon relative rotation of the first said drum section and said sleeve for moving said complemental drum sections about their hinged connections toward and from said sleeve, the hub of the first said section being eccentric to the periphery of said drum to provide maximum collapsing movement, and means rotatably mounted relative to said shaft and engageable with the first said drum section for effecting collapsing and expanding of said drum to free the belts from said grooves and to seat the belts in said grooves in a taut condition.

4. Apparatus for mounting endless belts for vulcanizing them, said apparatus comprising a support, a shaft nonrotatably mounted thereon, a collapsible belt-molding drum removably mounted on said shaft and having a plurality of circumferential grooves thereabout in spaced apart relation, said drum comprising a sleeve arranged for non-rotative engagement with said shaft, a drum section having a fixed hub with a bore rotatively mounted on said sleeve, complemental drum sections moveable relative to the first said section and hingedly secured thereto, means connected between one of said complementary drum sections and said sleeve and roller means on one of said movable drum sections engaging cooperating cam means on the other movable drum section and effective upon relative rotation of the first said drum section and said sleeve for moving said complementary drum sections about their hinged connections toward and from said sleeve, the hub of the first said section being eccentric to the periphery of said drum to provide maximum collapsing movement, and means rotatably mounted relative to said shaft and engageable with the first said drum section for effecting collapsing and expanding of said drum to free the belts from said grooves and to seat the belts in said grooves in a taut condition.

ROBERT R. AMBLER.

REFERENCES CITED

The following references are of record in the file of this patent:

UNITED STATES PATENTS

| Number | Name | Date |
| --- | --- | --- |
| 1,300,391 | Hibbs | Apr. 15, 1919 |
| 1,389,441 | De Mattia | Aug. 30, 1921 |
| 1,648,132 | Johnson | Nov. 8, 1927 |
| 1,729,329 | Chilton | Sept. 24, 1929 |
| 1,731,817 | Hudson | Oct. 15, 1929 |
| 1,732,194 | Miller | Oct. 15, 1929 |
| 1,747,856 | Burkley et al. | Feb. 18, 1930 |
| 1,926,345 | Miller | Sept. 12, 1933 |